United States Patent
Voigtlaender et al.

(10) Patent No.: US 9,360,617 B2
(45) Date of Patent: Jun. 7, 2016

(54) MODE FILTER WITH REFRACTIVE INDEX MODIFICATION

(71) Applicants: Fraunhofer-Gesellschaft zur Foerderung der angewandten Forschung e. V., Munich (DE); Friedrich-Schiller-Universitaet Jena, Jena (DE)

(72) Inventors: Christian Voigtlaender, Jena (DE); Jens Ulrich Thomas, Jena (DE); Robert Williams, Berowra (AU); Stefan Nolte, Jena (DE); Andreas Tuennermann, Weimar (DE)

(73) Assignees: Fraunhofer-Gesellschaft zur Foerderung der angewandten Forschung e. V., Munich (DE); Fried-Schiller-Universitaet Jena, Jena (DE)

( * ) Notice: Subject to any disclaimer, the term of this patent is extended or adjusted under 35 U.S.C. 154(b) by 0 days.

(21) Appl. No.: 14/348,131
(22) PCT Filed: Sep. 27, 2012
(86) PCT No.: PCT/EP2012/004060
§ 371 (c)(1),
(2) Date: Mar. 28, 2014
(87) PCT Pub. No.: WO2013/045097
PCT Pub. Date: Apr. 4, 2013

(65) Prior Publication Data
US 2014/0362878 A1    Dec. 11, 2014

(30) Foreign Application Priority Data
Sep. 30, 2011   (DE) .................. 10 2011 114 586

(51) Int. Cl.
*G02B 6/02* (2006.01)
*G02B 6/14* (2006.01)
(Continued)

(52) U.S. Cl.
CPC ........ *G02B 6/02076* (2013.01); *G02B 6/02066* (2013.01); *G02B 6/14* (2013.01);
(Continued)

(58) Field of Classification Search
CPC .. G02B 6/14; G02B 6/02009; G02B 6/02052; G02B 6/02076; H01S 3/06708
See application file for complete search history.

(56) References Cited

U.S. PATENT DOCUMENTS 3,891,302 A * 6/1975 Dabby et al. ................. 385/37
3,909,110 A * 9/1975 Marcuse ...................... 385/28
(Continued)

FOREIGN PATENT DOCUMENTS

EP    0 736 784 A2    10/1996

OTHER PUBLICATIONS

S.-H. Chen and T.-J. Chen: "Observation of Mode Selection in a Radially Anisotropic Cylindrical Waveguide with Liquid-Crystal Cladding", Applied Physics Letters, AIP, American Institute of Physics, Melville, NY, US, vol. 64, No. 15, Apr. 11, 1994, pp. 1893-1895, XP000440938.
(Continued)

*Primary Examiner* — Daniel Petkovsek
(74) *Attorney, Agent, or Firm* — Collard & Roe, P.C.

(57) ABSTRACT

The invention relates to a mode filter for reducing higher-order modes, with an optical fiber (1), which has a core (2) and a cladding (3) surrounding the latter, wherein the cladding (3) and core (2) have refractive indices that differ from one another. In order to develop an alternative to the prior art, the mode filter according to the invention is designed in such a manner that the fiber (1) has, in a transition region (4) between core (2) and cladding (3), at least one local refractive index modification region (5) which is arranged in the radially outer region of the core (2) and extends into the region of the cladding (3).

9 Claims, 1 Drawing Sheet

(51) Int. Cl.
*H01S 3/067* (2006.01)
*G02B 6/036* (2006.01)

(52) U.S. Cl.
CPC ........ *H01S 3/06708* (2013.01); *G02B 6/02009* (2013.01); *G02B 6/02052* (2013.01); *G02B 6/03622* (2013.01); *G02B 6/03633* (2013.01)

(56) References Cited

U.S. PATENT DOCUMENTS

| | | | |
|---|---|---|---|
| 4,049,413 A | | 9/1977 | French |
| 4,743,083 A | * | 5/1988 | Schimpe .................... 385/37 |
| 5,613,028 A | * | 3/1997 | Antos et al. ................ 385/123 |
| 5,745,614 A | * | 4/1998 | Kersten et al. ............... 385/29 |
| 6,111,998 A | * | 8/2000 | Ido et al. .................... 385/29 |
| 6,130,974 A | | 10/2000 | Rivoallan |
| 6,389,207 B1 | * | 5/2002 | Berkey ...................... 385/124 |
| 7,095,924 B2 | * | 8/2006 | De Barros et al. ........... 385/37 |
| 7,308,173 B2 | * | 12/2007 | Kopp et al. .................. 385/43 |
| 7,412,118 B1 | | 8/2008 | Shaibani et al. |
| 7,486,858 B2 | * | 2/2009 | Gruener-Nielsen et al. .... 385/37 |
| 8,891,917 B2 | * | 11/2014 | Thomas ............... G02B 6/0208 385/29 |
| 2004/0057685 A1 | * | 3/2004 | Vavassori et al. ............. 385/126 |

OTHER PUBLICATIONS

International Search Report of PCT/EP2012/004060, mailed Jan. 23, 2013.

* cited by examiner

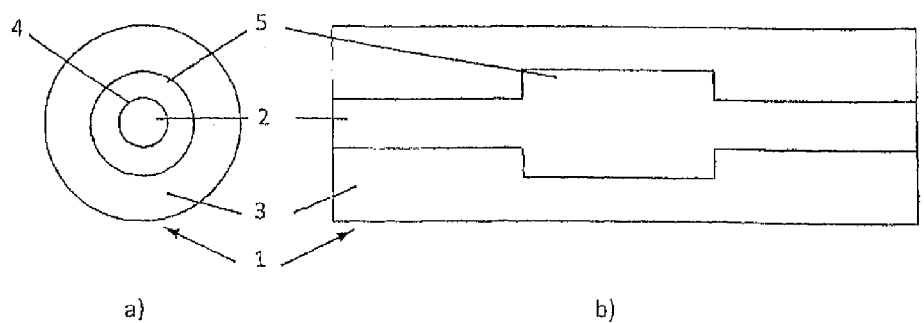
a)  b)  Fig. 1
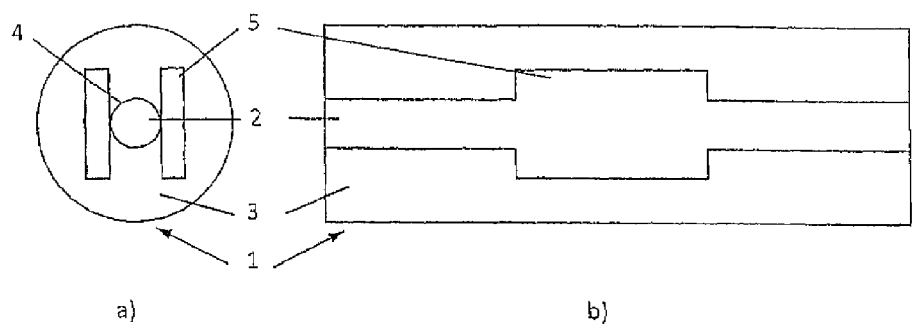
a)  b)  Fig. 2
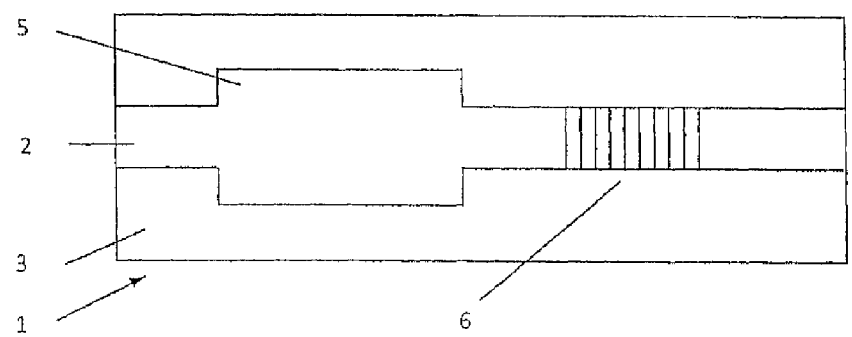
Fig. 3
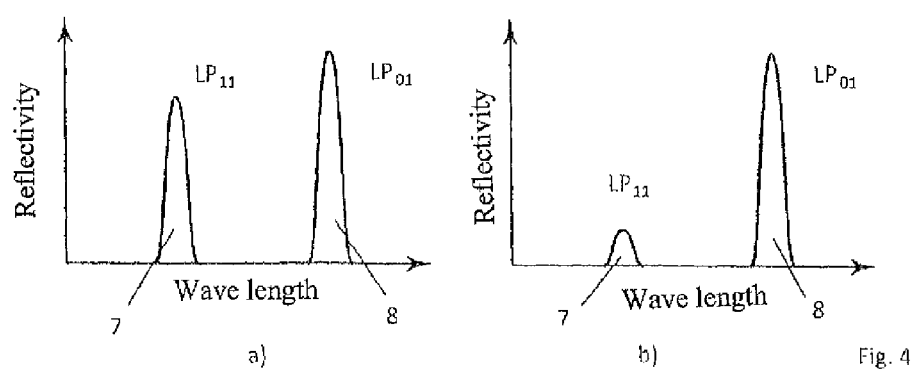
a)  b)  Fig. 4

MODE FILTER WITH REFRACTIVE INDEX MODIFICATION

CROSS REFERENCE TO RELATED APPLICATIONS

This application is the National Stage of PCT/EP2012/004060 filed on Sept. 27, 2012, which claims priority under 35 U.S.C. §119 of German Application No. 10 2011 114 586.2 filed on Sep. 30, 2011, the disclosure of which is incorporated by reference. The international application under PCT article 21(2) was not published in English.

The invention relates to a mode filter for reducing higher-order modes, with an optical fibre, which has a core and a cladding surrounding the latter, wherein the cladding and core have refractive indices that differ from one another. The invention also relates to a fibre laser, more particularly to a multi-mode high-power fibre laser which utilizes a mode filter according to the present invention in order to suppress higher-order modes.

The demand for mode filters for reducing higher-order modes has enormously grown simultaneously with the intensified interest for fibre lasers. One reason lies in the insensitivity of a fibre laser versus external influences. Because the resonator mirrors are simultaneously relocated by means of fibre Bragg gratings inscribed into the fibre core, it results a completely fibre-integrated production of the fibre laser. The relatively small cross-section of the active medium within the fibre core ensures a very good heat transport to the outside. Thus it is also possible—without deteriorating the thermal properties—to increase the laser amplification by prolonging the fibre and thus to achieve very high output rates. However, with very high performance rates, the small cross section of the fibre core takes an adverse effect on the laser performance. The local limitation of the guided light leads to very high intensities in the fibre core, whereby the development of parasitic non-linear effects (Raman scattering, Brillouin scattering, and self-phase modulation) is provoked. This is additionally intensified by a long interaction length of the laser light with the fibre core.

In prior art, this disadvantage is hitherto reduced by the use of large mode area (LMA) fibres. LMA fibres have a clearly greater core diameter than conventional single mode fibres. This is achieved by a very small refractive index difference between fibre cladding and core. However, LMA fibres usually applied nowadays are not strictly single-mode fibres, whereby modes of higher order are also conducted within the fibre. This may cause mode interference and amplification conflicts of the individual modes. Additionally, higher-order modes deteriorate the radiation behavior of the laser. These disadvantages get intensified with a growing core diameter, because multi-modality is increased there.

Therefore, there are further solution approaches existing in prior art in order to be able to utilize the large core of multi-mode fibres in fibre lasers. These are mainly based on exciting the base mode selectively. For example, this can be achieved by a combination of a single mode fibre having a small core diameter and a multi-mode fibre having a large core diameter arranged downstream in the direction of beam. Accordingly, the active multi-mode fibre is utilized as amplifier. A problematic point, however, is that the modes can overcouple into each other due to interferences. Furthermore, a stronger active endowment of the center of the core of the multi-mode fibre leads to the intensifying the base mode more than the higher-order modes.

Alternatively, there are other solutions which achieve a mode filtration by means of a modified Fabry-Perot cavity comprised of two fibre Bragg gratings. Accordingly, the spectral properties of the fibre Bragg grating overlay each other with the cavity. It results a reflectance spectrum in which there is a transmission minimum due to the properties of the cavity within the reflectance peak of the fibre Bragg gratings. By means of an additional refractive index change brought between the fibre Bragg gratings into the fibre core and extending along the fibre axis, the optical path length of the modes is changed. If the optical path length for the various modes of the fibre is changed in different strength, the wavelength of the Fabry-Perot cavity of the modes is shifted in different strength. It is thereby possible to achieve a mode selection.

In contrast with prior art, the present invention strives to provide an alternative mode filter in which the expenditure of manufacture is minimized and in which additional filter components like fibre Bragg gratings are no longer required.

This object is achieved by the present invention in that the fibre in the transition region of the core and cladding has at least one local refractive index modification range that is arranged in the outer area of the core and extends into the area of the cladding.

By way of this configuration, the guidance properties of the fibre are subsequently modified in a certain area so that the higher-order modes experience a greater guidance loss than in the other areas of the fibre. The refractive index modification range(s) is are located along the outer boundary of the fibre core at the transition to the cladding. By means of the inventive solution is no longer required to splice different fibres which on the one hand leads to an increased absorption at the transition points and which on the other hand calls for substantial adjustments. Furthermore, in contrast with prior art in technology, is not required to produce two fibre Bragg gratings harmonized to each other in form of a short cavity. The new approach can also be applied without a fibre Bragg grating.

The invention provides for that the length of the refractive index modification region is limited in axial direction of the fibre. Advantageously, the length corresponds to the simple to multiple (e.g. up to the ten-fold) magnitude of the core diameter. This length is sufficient to increase the mode field diameter of the higher-order modes. As soon as the modes reach the end of the refractive index modification region, losses occur at the guidance cross-section which gets smaller, whereby the higher-order modes which in contrast with the base mode do not mainly propagate in the core center, suffer losses when coupling back into the fiber core.

It is recommendable that the refractive index modification region has a refractive index greater than that of the cladding. In particular it is recommendable that the refractive index modification region has a refractive index equal to that of the core. If the refractive index around the fiber core in a range limited in axial direction of the fiber is raised to the level of the core, the modes propagating in the core see a greater effective core in this refractive index modification region. The mode field diameter is enhanced as described hereinabove until the modes reach the end of the refractive index stroke (i.e. the refractive index modification range) and thereby selectively suffer losses. This effect can be utilized in an active laser fiber in order to increase the losses of higher-order modes and thus to force the laser to a single-mode emission.

In one embodiment it is provided for that the refractive index modification range is arranged in form of a cylinder around the core. This results in an even loss of higher-order modes over the fibre circumference.

Alternatively it may be provided for that the refractive index modification region is of a shape deviating from the cylindrical shape. In particular suitable is a mode filter in which two refractive index modification regions being in parallel to each other are so configured that they tangentially touch the core on opposite sides. A polarization-dependent selection of the modes conducted in the fibre can hereby be achieved additionally. This is especially useful where laser light with a linearly polarized output radiation is desired. Apart from this form of the refractive index modification region, other forms are also conceivable, in particular those forms which are also suitable for polarization-selective fibres, for example star-shaped, quadratic or other cross-sectional shapes.

It may be provided for that the fibre has several refractive index modification regions in axial direction. Thereby, the filtration can be realized in several stages arranged one behind the other, whereby the quality of filtration can be additionally increased. Likewise, it would be possible to harmonize the refractive index modification regions arranged one behind the other in axial direction so that the refractive index stroke increases from modification region to modification region, or the length or diameter of the modification region. Likewise, regions of a cylindrical shape and polarization-selective regions may also alternate.

Furthermore, it is possible that the core additionally has one or more fibre Bragg gratings. Fibre Bragg gratings have a periodical refractive index modulation introduced into the core in axial direction of the fibre. Since the individual modes in a multi-mode fibre have different effective refractive indices, several reflections at different wavelengths occur in the reflectance spectrum according to the Bragg condition. If the fibre Bragg grating is combined with the afore-mentioned mode filter, the reflectivity of the higher modes is reduced which in a laser leads to a preferred intensification of the base mode. Thus, by combining the mode filter and fibre Bragg grating, a wavelength stabilization is also achieved apart from the single-mode behavior. On the whole, the insensitivity of the fibre laser versus ambient influences increases.

Finally, it may be provided for that the fibre is a large-mode-area (LMA) fibre. The inventive approach therefore is precisely suitable for those fibres which in general are utilized for the build-up of single-mode high-power fibre lasers. Since the LMA fibres are slightly multi-mode, the mode-filter described hereinabove is especially suitable for these.

Other advantages and features of the present invention are elucidated in greater detail in the following based upon the practical examples for the inventive device as illustrated in the figures attached hereto, where FIG. 1 a, b: shows a fibre with a cylindrical refractive index modification region in cross-section (a) and longitudinal section (b);

FIG. 2 a, b: shows a fibre with two refractive index modification regions being in parallel to each other in cross-section (a) and longitudinal section (b);

FIG. 3: shows a combination of a fiber with a refractive index modification region and a fiber Bragg grating;

FIG. 4 a, b: shows two reflection spectrae of a 2-mode fiber with a fiber Bragg grating, (a) without additional refractive index modification, (b) with additional refractive index modification.

FIGS. 1 (a) und (b) show a fiber 1 with a core 2 and a cladding 3. Located between core 2 and cladding 3 is a transition region 4. In the region of the transition region 4, there is a refractive index modification region 5 arranged at the radially outwardly pointing limitation of the core 2, said refractive index modification region 5 extends radially outwardly beyond the limitation of core 2, viewed in the longitudinal section of the fiber.

FIGS. 2 (a) und (b) also show a fiber 1 with a core 2 and a cladding 3. Arranged at the radially outwardly pointing limitation of the core 2 are two refractive index modification regions 5 which run in parallel to each other and which tangentially touch the core 2 on opposite sides.

FIG. 3 shows a fiber with a refractive index modification region 5 and a fiber Bragg grating 6. Alternatively, the refractive index modification 5 may also be combined with the fiber Bragg grating 6.

FIGS. 4 (a) and (b) show reflection spectrae of a 2-mode fiber with a fiber Bragg grating within the core 2. FIG. 4 (a) illustrates the reflectivity spectrum of fiber 1 without additional refractive index modification region 5, while FIG. 4 (b) indicates the reflectivity spectrum of fiber 1 with additional refractive index modification region 5. Shown there is the reflectivity of two modes 7, 8 each, wherein one mode is the LP11—mode 7 and the other mode is the LP01—mode 8.

The invention according to the fibre arrangement shown in FIG. 1 is elucidated in the following based upon a 2-mode fibre 1 in which two modes 7,8 are capable of propagating, that means for example the LP11—mode 7 and the LP01—mode 8. The two modes propagate within core 2 and cladding 3 of the fiber, wherein mode LP01 8 mainly propagates as base mode in the center of core 2. The LP11—mode 7 is a higher-order mode. As compared with the base mode 8, it propagates more near the transition region 4 between core 2 and cladding 3. The inventive mode filter according to FIG. 1 has a refractive index modification region 5 arranged in form of a cylinder around the core 2. This refractive index modification region 5 has the same refractive index as core 2. Thereby, this refractive index modification region 5 represents a local extension in diameter of core 2 which has a finite length in axial direction of the fibre 1. Owing to this refractive index modification region 5 extending radially beyond the limitation of core 2, the refractive index is raised there to the level of the core 2 whereby the modes 7, 8 propagating in the core 2 see a greater effective core 2 in this region 5. The mode field diameter is enhanced until the modes 7, 8 reach the end of the finite refractive index modification region 5. Since the base mode 8 has the highest intensity in the center of core 2, it experiences the least losses at this decreasing guidance cross-section. At the transition point, the higher mode 7 has greater losses when coupling-back into the original decreased diameter of core 2. This leads to an increase in the losses of the higher mode 7 whereby a mode filtration occurs.

FIG. 4 shows the effect of the inventive mode filtration, here for a practical example with a fibre Bragg grating as illustrated in FIG. 3. FIG. 4 (a) indicates the reflectivity spectrum of a fibre Bragg grating of a 2-mode fibre 1 which has no refractive index modification region 5. In contrast therewith, FIG. 4 (b) shows the reflectivity spectrum of a fibre Bragg grating of a similar fibre 1 with a refractive index modification region 5. It can be seen that the higher-order mode (LP11—Mode) 7 in case of applying a refractive index modification region 5 has substantially less reflectivity so that within fibre 1 it is mainly only the base mode (LP01—mode) 8 that propagates.

In accordance with FIG. 2, the refractive index modification region 5 may also be comprised of two separate refractive index modification regions 5 which are configured as being parallel to each other and which tangentially touch the core 2 on opposite sides (FIG. 2 a)). Inasmuch as modes 7, 8 propagate with different polarization directions within fibre 1, a polarization filtrating is thereby achieved that only the modes 7, 8 entering into contact with the refractive index modification regions in their oscillation plane perceive the relevant refractive index stroke. To this extent, a polarization filtration can also be realized by way of the inventive mode filter.

The invention claimed is:
1. A mode filter for reducing higher-order modes, the mode filter comprising:
   an optical fiber having
      a core having a core refractive index,
      a cladding surrounding the core and having a cladding refractive index, and
      a transition region between the core and the cladding,
   wherein the cladding refractive index is different from the core refractive index,
   wherein the optical fiber has in the transition region at least one local refractive index modification region arranged in a radially outer region of the core and extending into the cladding, and
   wherein the at least one local refractive index modification region comprises:
      a first refractive index modification region touching the core only along a first tangential touching region, the first tangential touching region being along a first side of the core and
      a second refractive index modification region running parallel to the first refractive index modification region and touching the core only along a second tangential touching region, the second tangential touching region being along a second side of the core, the second side of the core being disposed opposite from the first side of the core.

2. The mode filter according to claim 1, wherein a length of the at least one local refractive index modification region is limited in an axial direction of the optical fiber.

3. The mode filter according to claim 2, wherein the length of the at least one local refractive index modification region is within a range of from a diameter of the core to a multiple magnitude of the diameter of the core.

4. The mode filter according to claim 1, wherein the at least one local refractive index modification region has a modification region refractive index, and
   wherein the modification region refractive index is greater than the cladding refractive index.

5. The mode filter according to claim 4, wherein the modification region refractive index is equal to the core refractive index.

6. The mode filter according to claim 1, wherein the optical fiber has several refractive index modification regions in an axial direction.

7. The mode filter according to claim 1, wherein the core additionally has one or several fiber Bragg gratings.

8. The mode filter according to claim 1, wherein the optical fiber is a large-mode-area (LMA) fiber.

9. A multi-mode high-power fiber laser comprising a mode filter according to claim 1.

* * * * *